June 19, 1951 W. ANGST ET AL 2,557,856
ALTIMETER
Filed May 6, 1947 3 Sheets-Sheet 3

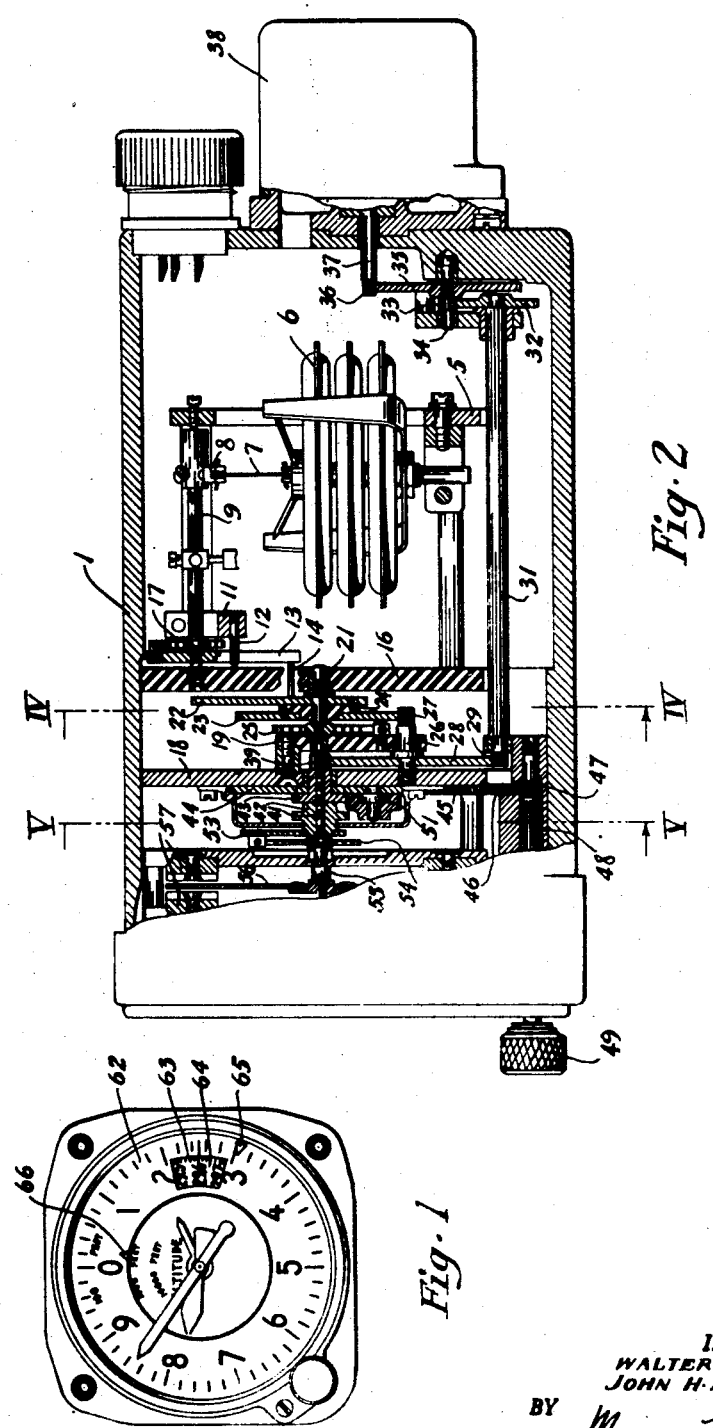

INVENTOR.
WALTER ANGST
JOHN H. ANDRESEN jr.
BY
ATTORNEY

UNITED STATES PATENT OFFICE 2,557,856

ALTIMETER

Walter Angst, Manhasset, and John H. Andresen, Jr., Port Washington, N. Y., assignors, by mesne assignments, to Kollsman Instrument Corporation, Elmhurst, N. Y., a corporation of New York Application May 6, 1947, Serial No. 746,212

11 Claims. (Cl. 73—387)

This invention relates to an altimeter for aircraft and has for its object the provision of a barometric altimeter having increased sensitivity and accuracy particularly at high altitudes where the change in barometric pressure for a unit change in height is small.

The altitude-pressure relationship is substantially logarithmic so that at the higher altitudes now accessible to jet propelled aircraft the change in barometric pressure for a given change in altitude is so small that with ordinary barometric altimeters the accuracy and sensitivity of the instrument renders it unacceptable for such high altitude indications. To show the difficulties involved: at sea level, a 100′ change in elevation corresponds to a change in pressure of 0.1″ Hg which corresponds to a movement to 0.001″ of a standard aneroid capsule while at an altitude of 80,000 feet the same 100′ change in altitude produces a pressure change of only 0.004″ Hg corresponding to an aneroid capsule movement of only 0.00004″. With the extremely small pressure changes and movements involved, it is impossible to operate the instrument accurately with the load which is normally placed on the aneroid capsule of a barometric altimeter through the various gears, shafts and pointers which it normally operates. According to the altimeter of this invention, this load is absorbed by an electric motor while the aneroid capsule moves an electric contact which imposes only a negligible load thereon. The control of the electric motor is effected through the cooperation of the aneroid controlled contact and a second contact driven by the motor which takes the form of a rotating cam following a substantially logarithmic curve to secure a linear scale and pointer movement for the instrument.

The broad features of a barometric altimeter employing an electrical follow-up system controlled by aneroid and motor driven contacts are disclosed and claimed in a co-pending application of John H. Andresen, Jr., Serial No. 644,136, filed January 29, 1946, now Patent No. 2,437,064, for Motor Control. The improvement of this invention lies particularly in the provision of a rotary contact of cam shape to be driven by the operating motor which provides the linear response and hence the multi-revolution pointer movement required for the extended range of the instrument.

The objects and features of the invention will be readily apparent to those skilled in the art from the specification and appended drawings illustrating certain preferred embodiments in which:

Fig. 1 is a front elevational view of the instrument.

Fig. 2 is a partial longitudinal sectional view of the instrument.

Figure 4:
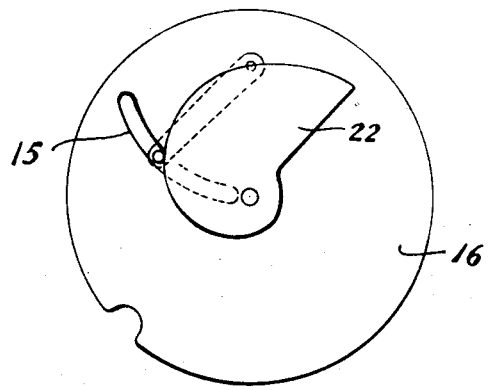
Fig. 4 is a transverse sectional view on the line IV—IV of Figure 2.

The altimeter of the present invention comprises an air-tight case 1 closed by a transparent plate 2 pressed against a sealing gasket 3 by a bezel ring 4. The interior of the casing 1 is adapted to be connected to the static line of a Pitot static tube so that the pressure within the casing corresponds to the pressure of the atmosphere in which the aircraft is flying. Within the casing 1 upon a stationary support 5 is mounted an aneroid capsule group 6 whose free end is connected through a link 7 to an arm 8 rigidly connected to a rotatable shaft 9. Upon the shaft 9 is mounted a bracket 11 carrying an operating pin 12. Rotatably mounted on the shaft 9 so as to be freely rotatable thereon is an arm 13 carrying an electric contact pin 14 which extends through an elongated slot 15 in an insulating supporting plate 16. A coil spring 17 has one end connected to the arm 13 and its opposite end connected to a collar rigid on the shaft 9 so that the arm 13 is biased in a counterclockwise direction as viewed in Figure 4 against the operating pin 12 which thus determines the position of arm 13 and contact 14 while permitting free movement thereof in a clockwise direction, as viewed in Figure 4, against the bias of spring 17. The spring 17 also serves as the electrical connection to contact pin 14 through arm 13.

Parallel with the insulating supporting plate 16 is a supporting plate 18 which carries a third and smaller insulating supporting plate 19. Between the supporting plates 16 and 19 is pivotally mounted a shaft 21 having rigidly mounted thereon a conducting cam 22 and a gear 23 suitably insulated from the cam by an insulating collar 24. The contact pin 14 engages the edge of the cam 22 in the operation of the instrument and these two elements, the pin and cam, form the make-break contacts for the control circuit of the operation motor. A coil spring 25 biases shaft 21 to remove backlash and also serves as the electrical connection therethrough to contact cam 22.

Pivoted in the supporting plates 18 and 19 is a shaft 26 having a pinion end 27 meshing with gear 23 and also carrying a gear 28 meshing with the pinion end 29 of an elongated shaft 31 which carries at its opposite end a gear 32 meshing with a pinion 33 mounted on a shaft 34 which also carries gear 35 meshing with a pinion 36 on the end of the shaft 37 of a reversing electric motor 38.

For zero setting the barometric pressure into the instrument, a system of planetary gears is provided to permit pointer rotation without rotating the operating parts of the switch. The gear 28 meshes with a pinion 39 on a shaft 41 which has a first gear 43 rigidly mounted thereon and a second gear 42 freely rotatable thereon. Also concentric with the shaft 41 is a freely rotatable flat gear 44 supported on the front face of the support 18. The gear 44 is connected through a pair of gears 45 and 46 to a pinion 47 on a shaft 48 which extends to the front of the instrument and terminates in a manual adjusting knob 49. Rotatably supported upon the gear 44 are a pair of gears 51 and 52 arranged so that the gear 51 meshes with gear 43 and gear 52 while the gear 52 meshes with gear 51 and gear 42.

Rigidly mounted on the gear 42 is an arm 53 carrying one end of a drive spring 54 whose other end is rigidly connected to a collar on a shaft 55. Rigidly mounted on the shaft 55 is a conducting disk 56 freely rotatable between a plurality of opposed pair of permanent magnets 57. Upon the forward end of the shaft 55 is mounted the unit pointer 58.

Figure 3:
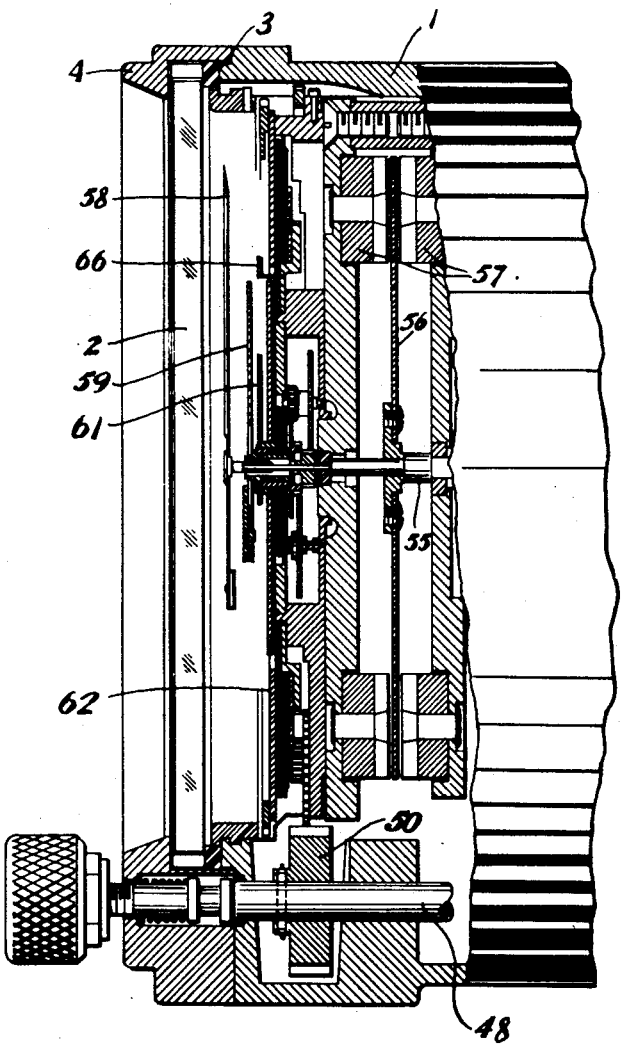
Fig. 3 is an enlarged longitudinal sectional view of the front portion of the instrument.

In addition to the pointer 58 two additional pointers 59 and 61 are provided which rotate with the pointer 58 but at ratios of 1:10 and 1:100, respectively. Suitable gearing similar to clockwork reduction gearing is provided for effecting this movement and is illustrated in part in Figure 3, but will not be described in detail as it forms no part of the present invention. Behind the pointers 58, 59, 61, the instrument is provided with a dial 62 which bears indicia of altitude and is provided with a window 63 through which may be viewed a rotatable sub-dial 64 bearing indicia of barometric pressure in inches of mercury. There are further provided a pair of rotatable reference indices 65 and 66. Upon the shaft 48 is mounted a gear 50 which through suitable gearing, partially shown in Figure 3, serves to rotate the sub-dial 64 and the reference indices 65 and 66 to permit the barometric or zero setting to be determined both in inches of mercury and feet of altitude.

Figure 5:
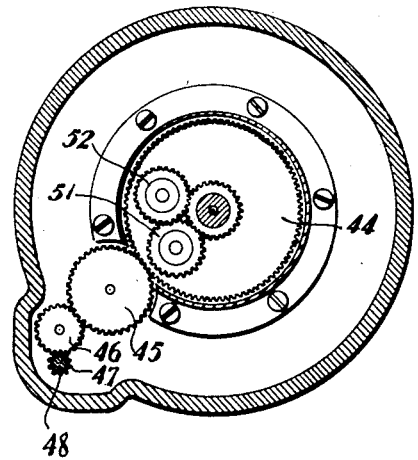
Fig. 5 is a transverse sectional view on the line V—V of Figure 2.

In the operation of the instrument, the ground barometric pressure from the base station is set into the instrument by manipulation of the knob 49. The reading of the value set is determined either from the sub-dial 64 or the reference indices 65 and 66. This rotation of the knob 49 and shaft 48 will, through the planetary gearing previously described and particularly shown in Figures 2 and 5, effect rotation of the shaft 55 and of the pointers 58, 59 and 61 without disturbing the pressure operating portions of the altimeter. The pinion 47 on shaft 48 rotates gears 46 and 45 to rotate gear plate 44. As gear plate 44 rotates, gear 43 and shaft 41 remain stationary but gear 42 rotates to rotate arm 53 and through spring 54 rotate shaft 55 to move the instrument pointers.

As the instrument changes in altitude, the pressure within casing 1 changes and movement is effected of the free end of the aneroid capsule group 6. This, through link 7 and arm 8, effects rotation of the shaft 9 to move operating pin 12 and hence effect movement of arm 13 and contact pin 14 either by or against the bias of spring 17. Assuming an increase in altitude, the capsule expands to rotate contact carrying arm 13 in a counterclockwise direction as viewed in Figure 4. The contact pin 14 then engages the edge of contact cam 22 to complete the motor circuit for rotation in one direction. Rotation of the motor will effect rotation of its shaft 37, pinion 36, gear 35, pinion 33, gear 32, shaft 31, pinion 29, gear 28, pinion 27, gear 23 and shaft 21 which rotates the gear 22 in the direction to present a cam portion of decreased radius to the contact pin. This movement continues until the pin and cam separate at which point the motor hunts in opposite directions with momentary make and break of the contact between pin 14 and cam 22. This motor rotation also effects pointer rotation since the gear 28 rotates pinion 39, shaft 41 and gear 43 which, through gears 51 and 52, effects rotation of the gear 42 upon which is mounted the arm 53. Arm 53 drives pointer operating shaft 55 through the spring 54.

When the altitude of the instrument decreases, the contact between 14 and 22 is broken so that motor 38 rotates in a reverse direction to present a portion of the cam of larger diameter to the pin with appropriate pointer rotation in the descending direction. It is thus seen that as the contact pin 14 is moved by the aneroid capsule group 6 in response to change in altitude pressure, the motor 38 drives in the proper direction to maintain the cam 22 in make-break cooperation with the contact pin 14 and that as the cam is rotated the indicating pointers of the instrument are rotated to indicate the altitude corresponding to the altitude pressure in which the instrument is located. It will be seen that a light and negligible load is placed upon the aneroid capsule in effecting movement of the contact pin 14 while the major instrument mechanism is driven by the motor 38 which can be selected to have adequate torque.

The conducting disk 56 rotating between the permanent magnets 57 serves to dampen oscillations in the instrument. The drive spring 54 serves to absorb the relatively high frequency cycling action of the mechanism as the motor "hunts" at the contact make-break point.

Since the altitude-pressure relationship is substantially logarithmic and the aneroid capsule responds substantially linearly to pressure changes and it is desired to have a linear motion of the pointers, the cam 22 takes the shape of substantially a logarithmic curve. However, this curve is empirically established by the actual diaphragm response to the pressure changes. In fact, for extreme accuracy, the curve of each cam 22 is established for the particular aneroid capsule group with which it is to be used.

Figure 6:
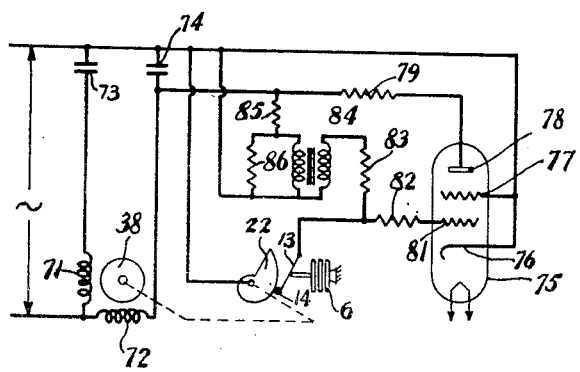
Fig. 6 shows the wiring diagram for the motor control.

The wiring diagram of the motor 38 is shown in Figure 6 in which the motor 38 is provided with a two phase winding 71 and 72. The winding 71 is connected across the line through condenser 73. The winding 72 is connected to the line in a parallel circuit, one leg of which comprises a condenser 74 and the other of which is through an electronic tube 75. The tube 75 has its cathode 76 and suppresser grid 77 connected to one side of the line and its plate 78 connected through a resistor 79 to the winding 72. The control grid 81 is connected through a limiting resistor 82 to the contact finger 14 and the cam contact 22 is connected to the same side of the line as the tube cathode. The negative bias on grid 81 is supplied through a second limiting resistor 83 from the secondary of a transformer 84 whose primary is fed from the motor circuit through resistor 85 with a by-pass resistor 86.

Condenser 74 is selected to have a lower capacity than condenser 73 so that when the tube 75 is not firing the current in winding 72 will lead in time-phase relationship the current in winding 71 to cause rotation of the motor in one direction. This is the condition when the circuit is broken at contacts 14, 22. While the circuit is completed through contacts 14, 22, the tube 75 fires to by-pass the condenser 74 and supply a substantially resistive circuit through which winding 72 is fed. Now the current in winding 72 follows in time-phase relationship the current in winding 71 and hence the motor 38 rotates in the reverse direction. Thus, when the contacts are disengaged, the tube does not fire and the motor rotates in one direction and while the contacts are engaged the tube fires to effect motor rotation in the reverse direction.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. An altimeter comprising pressure responsive means, a first electric contact movable by said pressure responsive means, a second electric contact cooperating with said first contact to make and break an electric circuit, a reversing electric motor for driving said second contact, a reversing circuit for said motor controlled by said contacts, indicia of altitude, a pivoted pointer cooperating with said indicia and having a driving connection with said motor to effect pointer movement as said second contact is moved, at least one of said contacts being in the form of a rotatable cam shaped to provide for linear angular rotation of the pointer in response to movement of the pressure responsive means as the barometric pressure changes with change in altitude.

2. An altimeter comprising pressure responsive means, a first electric contact movable by said pressure responsive means, a second electric contact cooperating with said first contact to made and break an electric circuit, a reversing electric motor for driving said second contact, a reversing circuit for said motor controlled by said contacts, indicia of altitude, a pointer cooperating with said indicia and having a driving connection with said motor to effect pointer movement as said second contact is moved, at least one of said contacts being in the form of a rotatable cam whose contact surface follows a substantially logarithmic curve to effect linear pointer movement as the barometric pressure changes with change in altitude.

3. An altimeter comprising pressure responsive means, a first electric contact movable by said pressure responsive means, a second electric contact cooperating with said first contact to make and break an electric circuit, a reversing electric motor for driving said second contact, a reversing circuit for said motor controlled by said contacts, indicia of altitude, a pivoted pointer cooperating with said indicia and having a driving connection with said motor to effect pointer movement as said second contact is moved, at least one of said contacts being in the form of a rotatable cam shaped to provide for linear angular rotation of the pointer in response to movement of the pressure responsive means as the barometric pressure changes with change in altitude, and a driving spring connection between said motor and pointer to prevent pointer oscillation as the mechanism cycles in reverse directions as the motor hunts at the contact make-break point.

4. An altimeter comprising pressure responsive means, a first electric contact movable by said pressure responsive means, a second electric contact cooperating with said first contact to make and break an electric circuit, a reversing electric motor for driving said second contact, a reversing circuit for said motor controlled by said contacts, indicia of altitude, a pointer cooperating with said indicia and having a driving connection with said motor to effect pointer movement as said second contact is moved, at least one of said contacts being in the form of a rotatable cam whose contact surface follows a substantially logarithmic curve to effect linear pointer movement as the barometric pressure changes with change in altitude, and a driving spring connection between said motor and pointer to prevent pointer oscillation as the mechanism cycles in reverse directions as the motor hunts at the contact make-break point.

5. An altimeter comprising pressure responsive means, a first electric contact movable by said pressure responsive means, a second electric contact cooperating with said first contact to make and break an electric circuit, a reversing electric motor for driving said second contact, a reversing circuit for said motor controlled by said contacts, indicia of altitude, a pivoted pointer cooperating with said indicia and having a driving connection with said motor to effect pointer movement as said second contact is moved, at least one of said contacts being in the form of a rotatable cam shaped to provide for linear angular rotation of the pointer in response to movement of the pressure responsive means as the barometric pressure changes with change in altitude, a driving shaft upon which said pointer is mounted, a driving spring connection between said reversing electric motor and said driving shaft, a dampening disk mounted upon said shaft, and means establishing a magnetic field through said disk to dampen pointer oscillation.

6. An altimeter comprising pressure responsive means, a first electric contact movable by said pressure responsive means, a second electric contact cooperating with said first contact to make and break an electric circuit, a reversing electric motor for driving said second contact, a reversing circuit for said motor controlled by said contacts, indicia of altitude, a pointer cooperating with said indicia and having a driving connection with said motor to effect pointer movement as said second contact is moved, at least one of said contacts being in the form of a rotatable cam whose contact surface follows a substantially logarithmic curve to effect linear pointer movement as the barometric pressure changes with change in altitude, a driving shaft upon which said pointer is mounted, a driving spring connection between said reversing electric motor and said driving shaft, a dampening disk mounted upon said shaft and means establishing a magnetic field through said disk to dampen pointer oscillation.

7. An altitude responsive device comprising pressure responsive means, a pivoted contact arm carrying a first electric contact thereon, means controlling the position of said contact arm and first contact by said pressure responsive means, a second electric contact cooperating with said first contact to make and break an electric circuit, said second contact being in the form of a rotatable cam providing for linear rotational movement of the cam in response to movement of the pressure responsive means with change in altitude, an electric motor connected to rotate said contact cam, a reversing circuit for said motor including said contacts and operating to rotate the motor in one direction when the contacts are engaged and in the opposite direction when the contacts are dis-engaged, and indicating means driven by said motor to a position corresponding to the position of the contact cam with the contacts at the make-break point thereby to indicate altitude.

8. In an altitude responsive device comprising pressure responsive means, a pivoted contact arm carrying a first electric contact thereon, means controlling the position of said contact arm and first contact by said pressure responsive means, a second electric contact cooperating with said first contact to make and break an electric circuit, said second contact being in the form of a rotatable cam providing for linear rotational movement of the cam in response to movement of the pressure responsive means with change in altitude, an electric motor connected to rotate said contact cam, a reversing circuit for said motor including said contacts and operating to rotate the motor in one direction when the contacts are engaged and in the opposite direction when the contacts are dis-engaged, and indicating means controlled by the angular position of said contact cam and indicating the altitude pressure for the cam position with the contacts at the make-break point.

9. In an altitude responsive device comprising pressure responsive means, a pivoted contact arm carrying a first electric contact thereon, means controlling the position of said contact arm and first contact by said pressure responsive means, a second electric contact cooperating with said first contact to make and break an electric circuit, said second contact being in the form of a rotatable cam providing for linear rotational movement of the cam in response to movement of the pressure responsive means with change in altitude, an electric motor connected to rotate said contact cam, a reversing circuit for said motor including said contacts and operating to rotate the motor in one direction when the contacts are engaged and in the opposite direction when the contacts are dis-engaged, and means controlled by the angular position of the contact cam to indicate the altitude pressure of the device.

10. An altimeter comprising pressure responsive means, stop means driven by said pressure responsive means, a rotatable contact arm spring biased against said stop means and carrying a first electric contact, a rotatable contact cam cooperating with said first electric contact and having a contact surface curved to provide equal increments of angular rotation of the contact cam for equal increments of altitude change, follow up means driving said contact cam to follow the position of said first electric contact to maintain the cam at the point of contact make and break, and indicating means driven with said cam to indicate the altitude pressure to which the pressure responsive means is subjected.

11. An altitude responsive instrument comprising pressure responsive means, an electric contact movable by said pressure responsive means, a rotatable contact cam cooperating with said electric contact and having a contact surface curved to provide equal increments of angular rotation of the contact cam for equal increments of altitude change, follow up means driving said contact cam to follow the position of said electric contact to maintain the cam at the point of contact make and break, and means controlled by the angular position of the contact cam so as to be responsive to the altitude pressure of the instrument.

WALTER ANGST.
JOHN H. ANDRESEN, Jr.

REFERENCES CITED

The following references are of record in the file of this patent:

UNITED STATES PATENTS

| Number | Name | Date |
|---|---|---|
| 1,934,375 | Reynolds et al. | Nov. 7, 1933 |
| 2,437,064 | Andresen, Jr. | Mar. 2, 1948 |

FOREIGN PATENTS

| Number | Country | Date |
|---|---|---|
| 248,384 | Great Britain | May 25, 1927 |
| 755,233 | France | Sept. 4, 1933 |